UNITED STATES PATENT OFFICE 2,395,471

DIAMIDINES

Arthur James Ewins, Romford, England, assignor to May & Baker Limited, Dagenham, England, a British company No Drawing. Application December 1, 1943, Serial No. 512,478. In Great Britain December 2, 1942

7 Claims. (Cl. 260—564)

This invention relates to new diamidine derivatives, specifically the 2-chloro, 2-bromo and 2-iodo derivatives of 4:4'-diamidino-stilbene, and also the salts thereof such as the dihydrochloride.

The unsubstituted or parent compound 4:4'-diamidino-stilbene possesses trypanocidal activity. Attempts hitherto made to enhance the therapeutic activity of compounds of this type by the introduction of various substituent atoms or groups into one or both of the benzene nuclei have usually been quite unsuccessful, the activity being either diminished or even eliminated. It has now unexpectedly been found that the 2-halogen derivatives of 4:4'-diamidino-stilbene possess important advantage over the parent compound, which advantage could not have been foreseen. The primary products of this invention are prepared, for example, by treating 2-chloro-, 2-bromo- or 2-iodo-4:4'-dicyano-stilbene in solution or suspension in an anhydrous alcohol (such as ethyl alcohol) with dry hydrogen chloride or dry hydrogen bromide whereby the cyanogen groups are converted into imino-ether hydrohalide groups and treating the compound so obtained with ammonia to yield the desired diamidine or a salt of the said diamidine. The alcoholic solution or suspension may contain an inert organic diluent such as chloroform or nitrobenzene. An alternative method of preparation comprises causing 2-chloro-, 2-bromo- or 2-iodo-4:4'-dicyano-stilbene to react with an alkali metal amide (for example sodamide), hydrolysing the alkali metal compound thus formed (for example with dilute hydrochloric acid) and isolating the required diamidino-stilbene either in the free state or in the form of a salt such as the dihydrochloride. In any case, where necessary, the end product is subjected to purification as by re-crystallisation.

The starting material, 2-chloro-, 2-bromo- or 2-iodo-4:4'-dicyano-stilbene, can be made following methods known per se. Thus, for example, it can be prepared from the corresponding 2-nitro compound through 2-amino-4:4'-dicyano-stilbene as hereinafter exemplified.

The invention may be illustrated by, but is not restricted to, the following examples:

EXAMPLE 1

This example illustrates the preparation of 2-chloro-4:4'-diamidino-stilbene from 2-chloro-4:4'-dicyano-stilbene itself prepared from 2-nitro-4:4'-dicyano-stilbene through the corresponding 2-amino compound.

*2-nitro-4:4'-dicyano-stilbene*

10 grams of 2-nitro-p-tolunitrile and 8.1 grams of 4-cyano-benzaldehyde were heated to 170 to 180° C., 1.2 ccs. and 0.6 ccs. of piperidine were added at quarter-hour intervals, heating was continued for a further one and quarter hours, the product cooled, triturated with glacial acetic acid and filtered. The residue was crystallised from glacial acetic acid as yellow needles, melting point 290° C.

*2-amino-4:4'-dicyano-stilbene*

10.0 grams of 2-nitro-4:4'-dicyano-stilbene thus prepared were suspended in 20 ccs. of glacial acetic acid and a hot solution of 50 grams of stannous chloride ($SnCl_2.2H_2O$) in 50 ccs. of concentrated hydrochloric acid was quickly added. Rapid reaction occurred and the boiling was continued for a further 4 minutes, the reaction mixture was cooled, filtered, and the stannous chloride residue decomposed with 25% aqueous caustic soda solution. The liberated amine crystallised from glacial acetic acid as yellow needles, melting point 232° C.

*2-chloro-4:4'-dicyano-stilbene*

10 grams of 2-amino-4:4'-dicyano-stilbene in 100 ccs. concentrated hydrochloric acid was mechanically agitated and diazotised over half an hour at 5° to 10° C. with sodium nitrite (8.0 grams/25 ccs. $H_2O$). The diazonium salt solution was decomposed by running into a boiling mixture of 375 ccs. of concentrated hydrochloric acid, 500 ccs. of water and 2 grams of copper bronze, the mixture filtered hot, and the residue crystallised once from pyridine and again from nitrobenzene. 2-chloro-4:4'-dicyano-stilbene separated as clusters of needles, melting point 242° C.

*2-chloro-4:4'-diamidino-stilbene*

6 grams of 2-chloro-4:4'-dicyanostilbene were suspended in 100 ccs. of absolute ethyl alcohol and the mixture saturated with dry hydrogen chloride at 0° C. The whole was left for 4 days at room temperature. The imino-ether hydrochloride was filtered off, washed with dry ether, and then added to 150 ccs. of 10% ethyl alcoholic ammonia, and the whole heated for 8 hours at 50° C. The 2-chloro-4:4'-diamidinostilbene dihydrochloride which separated was crystallised from methyl alcohol, dilute hydrochloric acid, and finally from a mixture of methyl alcohol and acetone. It forms colourless feathery needles, melting point >320° C. The diamidine base is obtained therefrom by the addition of aqueous caustic soda solution.

EXAMPLE 2

This example illustrates the preparation of 2-bromo-4:4'-diamidinostilbene from 2-bromo-4:4'-dicyanostilbene.

2-bromo-4:4'-dicyanostilbene 10.0 grams of 2-amino-4:4'-dicyanostilbene prepared by the method of Example 1 were diazotised at 5° to 10° C. in 100 ccs. of 51% hydrobromic acid with sodium nitrite (8.0 grams/15 ccs. $H_2O$), 8 grams of urea were added to decompose excess nitrous acid and the diazonium salt solution diluted with 125 ccs. water, poured into a boiling suspension of copper bronze in 12% hydrobromic acid (425 ccs.) and the product filtered. The residue crystallised from pyridine as puce coloured needles, melting point 241° C.

2-bromo-4:4'-diamidino-stilbene

This was prepared from 2-bromo-4:4'-dicyanostilbene in a similar manner to the 2-chloro-4:4'-diamidino-stilbene of Example 1. The crude product obtained from the imino ether hydrochloride and ethyl alcoholic ammonia was dissolved in water, and the solution treated with concentrated hydrochloric acid. The precipitate was filtered off, dried by washing with acetone, and then crystallised from methyl alcohol. 2-bromo-4:4'-diamidinostilbene dihydrochloride forms colourless needles, melting point 320° C. The diamidine itself is obtained from the salt by treatment with dilute caustic soda solution.

EXAMPLE 3

This example illustrates the preparation of 2-iodo-4:4'-diamidinostilbene from 2-iodo-4:4'-dicyanostilbene.

2-iodo-4-4'-dicyanostilbene 10 grams of 2-amino-4:4'-dicyanostilbene prepared by the method of Example 1 were dissolved in 50 ccs. of concentrated sulphuric acid and 150 grams of ice added. The amine sulphate suspension was diazotised at 5° to 10° C. over 1 hour with sodium nitrite (8 grams/water 30 ccs.); 8 grams of urea were added and the solution after stirring for 10 minutes was treated with potassium iodide (20 grams/20 ccs. $H_2O$). Rapid evolution of nitrogen occurred and the stirring was continued for three and a half hours. The solution was diluted to 500 ccs., boiled under reflux for 30 minutes, diluted, filtered, the residue washed with sodium thiosulphate solution, and crystallised with blacking from glacial acetic acid as clusters of light yellow needles, melting point 237° C.

2-iodo-4:4'-diamidino-stilbene

This was prepared from 2-iodo-4:4'-dicyanostilbene in a similar manner to the 2-chloro-4:4'-diamidino stilbene of Example 1. The 2-iodo-4:4'-diamidinostilbene dihydrochloride thus obtained was crystallised from methyl alcohol. It forms light yellow needles, melting point >320° C. The diamidine base is obtainable by treating the salt with dilute caustic soda solution.

In the foregoing examples, the preparation of the dihydrochlorides of the compounds of the invention is described.

Other salts may be obtained from the dihydrochloride, for example, by the addition of dilute alkali, dissolving the base thus produced in a solution of the appropriate acid (corresponding to the desired salt) and isolating the resulting salt.

Thus, for example, the di-isethionate may be produced by treating a solution of the dihydrochloride with alkali carbonate, separating and dissolving the resultant base in aqueous isethionic acid and precipitating the di-isethionate with acetone. Alternatively, the said salts (as also the dihydrochloride) may be prepared by reacting the corresponding ammonium salt with 2-chloro-, 2-bromo- or 2-iodostilbene-4:4'-bis-(carbon-iminoethyl ether) in aqueous alcoholic solution or suspension. Representative examples of such salts, in addition to the dihydrochloride and di-isethionate mentioned above, are the di-β-hydroxy-propane sulphonate, the di-lactate and the di-methane sulphonate.

It should be understood that where in the foregoing specification and in the appended claims the term "halogen" is employed, that term includes only chlorine, bromine and iodine.

The superiority of the compounds included in this invention is illustrated by a comparison of the chemotherapeutic ratios of 2-bromo-4:4'-diamidinostilbene with those of the parent compound, 4:4'-diamidinostilbene. The data shown in the following table relates to the effect of the respective products upon the experimental infection, Tr. equiperdum in mice.

Table

| | 4:4'-diamidinostilbene | | 2-bromo-4:4'-diamidinostilbene | |
|---|---|---|---|---|
| | I | S | I | S |
| L. D.₅₀ | 0.03 mg./g | 0.125 mg./g | 0.039 mg./g | 0.157 mg./g. |
| C. D.₅₀ | 0.01 mg./g | 0.01 mg./g | 0.0029 mg./g | 0.0017 mg./g. |
| C. R. | 3 | 12.5 | 14 | 95. |

I—by intravenous injection.
S—by subcutaneous injection.
L. D.₅₀—dosage which kills 50% of uninfected mice.
C. D.₅₀—dosage which cures 50% of infected mice.
C. R. — (Chemotherapeutic ratio) $\frac{L.D._{50}}{C.D._{50}}$ It will be seen that the ratios for the new product, both intraveneously and subcutaneously, are many times greater than those of the parent compound. Similar results have been obtained with the other halogen derivatives described in this application.

What I claim and desire to secure by Letters Patent is:

1. A member of the group consisting of the diamidine derivatives having the formula:

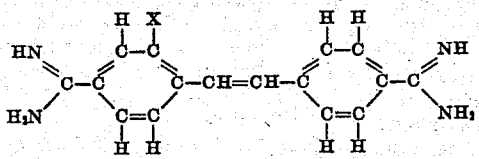

and the acid addition compounds of the said diamidine derivatives, in which X in the formula is a member of the group consisting of halogen atoms of atomic weight between about 35 and 127 inclusive.

2. 2-chloro-4:4'-diamidino-stilbene.
3. 2-bromo-4:4'-diamidino-stilbene.
4. 2-iodo-4:4'-diamidino-stilbene.
5. The dihydrochloride of 2-chloro-4:4'-diamidino-stilbene.
6. The dihydrochloride of 2-bromo-4:4'-diamidino-stilbene.
7. The dihydrochloride of 2-iodo-4:4'-diamidino-stilbene.

ARTHUR JAMES EWINS.